United States Patent [19]

Farrell et al.

[11] 4,203,464
[45] May 20, 1980

[54] DIAPHRAGM VALVE FOR FAUCETS

[75] Inventors: Gerald J. Farrell, Elmhurst; Rudy Y. Bisonaya, Oaklawn, both of Ill.

[73] Assignee: Elkay Manufacturing Company, Broadview, Ill.

[21] Appl. No.: 885,280

[22] Filed: Mar. 10, 1978

Related U.S. Application Data

[63] Continuation-in-part of Ser. No. 711,551, Aug. 4, 1976, abandoned, which is a continuation-in-part of Ser. No. 633,445, Nov. 19, 1975, abandoned.

[51] Int. Cl.$^2$ .................. F16K 11/14; F16K 7/12
[52] U.S. Cl. .................. 137/454.2; 137/607; 137/636.1; 251/175; 251/331
[58] Field of Search ............ 251/331, 333, 175, 312, 251/257, 61.1; 137/454.2, 636.1, 607

[56] References Cited

U.S. PATENT DOCUMENTS

| | | | |
|---|---|---|---|
| 1,986,475 | 1/1935 | Hewitt | 251/331 X |
| 2,043,003 | 9/1937 | Bowman et al. | 137/636.1 |
| 2,716,017 | 8/1955 | Linker | 251/331 |
| 2,966,928 | 1/1961 | Fairchild | 137/636.1 X |
| 3,151,838 | 10/1964 | Tripoli et al. | 251/267 |
| 3,246,872 | 4/1966 | Seltsam | 251/331 |
| 3,279,749 | 10/1966 | Fleckenstein et al. | 251/331 |
| 3,395,888 | 8/1968 | Neto | 251/331 X |
| 3,465,786 | 9/1969 | Spisak | 251/61.1 X |
| 3,561,480 | 2/1971 | Fairchild | 137/625.4 |
| 3,738,389 | 6/1973 | Cole et al. | 137/636.1 |
| 3,743,245 | 7/1973 | Demler, Sr. | 251/331 X |
| 3,807,455 | 4/1974 | Farrell | 137/625.31 |
| 4,044,998 | 8/1977 | Giese | 251/331 |

FOREIGN PATENT DOCUMENTS 506043 9/1954 Canada ............................. 251/61.1

*Primary Examiner*—Arnold Rosenthal
*Attorney, Agent, or Firm*—Leydig, Voit, Osann, Mayer & Holt, Ltd.

[57] ABSTRACT

A diaphragm valve for faucet valve assemblies is disclosed. The diaphragm has a thick valve closure portion received in an end recess in a valve plunger, the plunger being nonrotatable and reciprocably mounted in the valve body for movement relative to a valve seat against which the valve closure portion of the diaphragm is held in valve closed position. The valve diaphragm has a thin supporting section extending radially from the valve closure portion which rolls during the stroke of the valve plunger and the end of the valve plunger and the sidewall of the outlet chamber in the valve body provides a continuous surface against which the supporting section of the diaphragm is pressed without being stretched by the pressure of water in the outlet chamber in the valve open position of the diaphragm. In the valve closed position of the diaphragm, the inlet water pressure acts against the diaphragm to enhance the seal at the valve seat.

17 Claims, 13 Drawing Figures

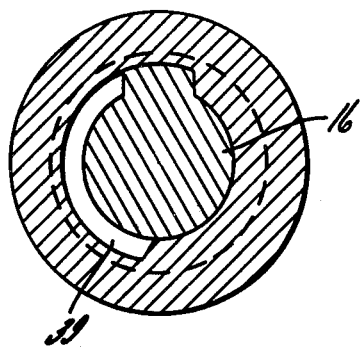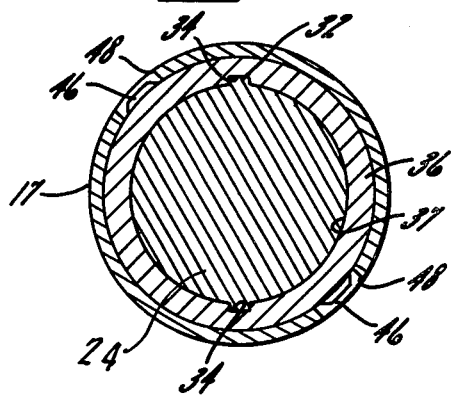

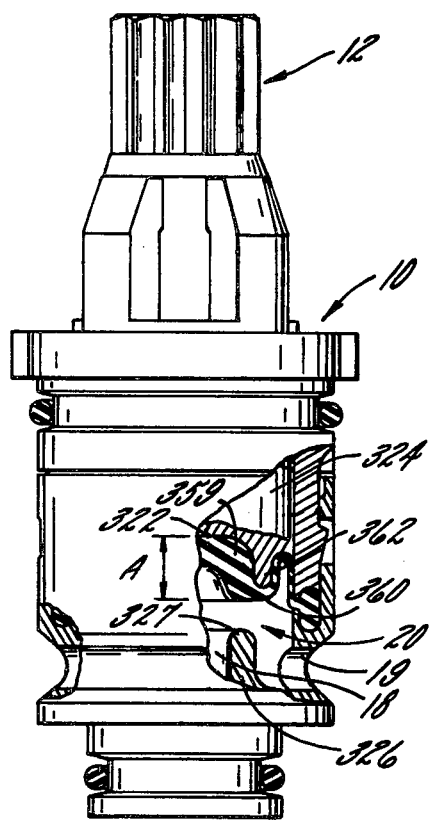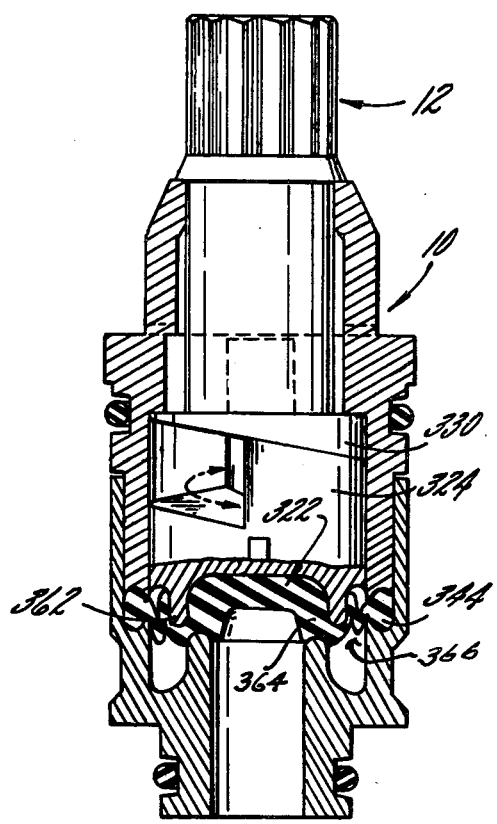

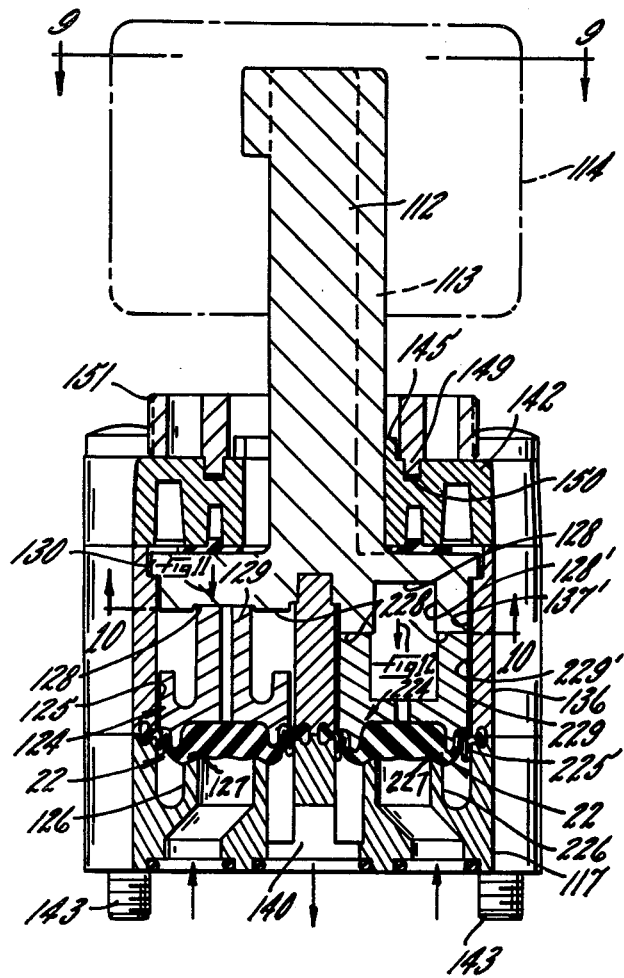
Fig. 8.
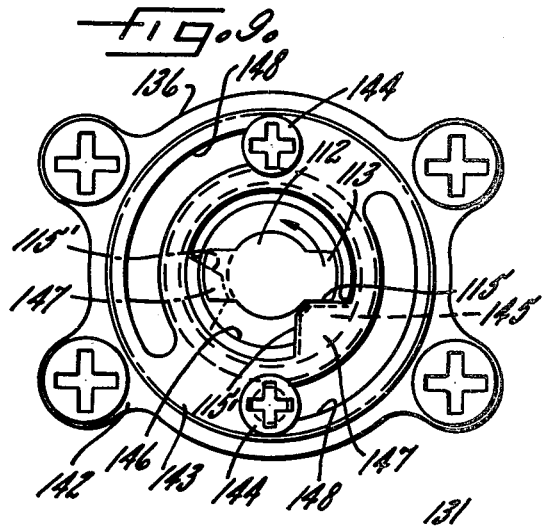
Fig. 9.
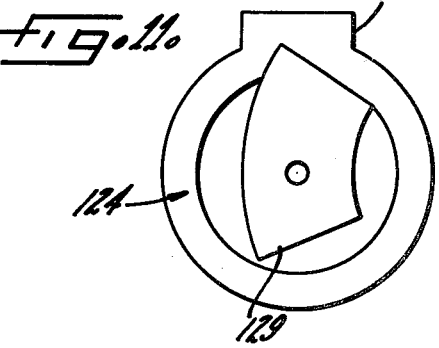
Fig. 11.
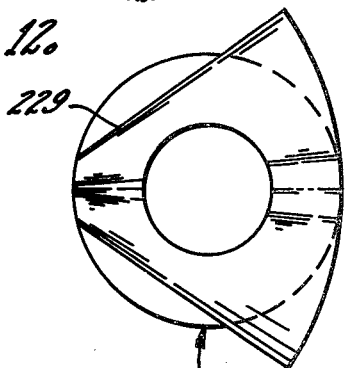
Fig. 12.
Fig. 10.
HOT CAM
HIGHEST POINTS ON COLD CAM
COLD CAM
ZERO REF. HOT CAM (OFF HOT)
ZERO REF. COLD CAM (OFF COLD)
HIGHEST POINT HOT CAM
LOW REF. POINT COLD CAM
LOW REF. POINT HOT CAM

DIAPHRAGM VALVE FOR FAUCETS

This is a continuation-in-part of application Ser. No. 711,551 filed Aug. 4, 1976 and now abandoned, which is a continuation-in-part of Ser. No. 633,445, filed Nov. 19, 1975 entitled "Diaphragm Valve" and now abandoned.

This invention relates to valves, and more particularly to cam operated diaphragm valves for use in water faucets and the like.

Heretofore, while diaphragm valves have been widely used in fluid flow lines for controlling flow or as shut-off valves, such valves have not come into widepread use in faucet valves for water systems. Diaphragm valves have not been generally considered for faucet valves, because of the relatively severe requirements.

Certain of these requirements relate to sealing characteristics specific to faucet valves. Additional requirements involve structural considerations unique to diaphragms wherein elastomeric materials are employed. Finally, the effect of the working environment, water in the case of faucet valves, on elastomeric diaphragm materials imposes special requirements.

The sealing characteristics required for faucet valves can be summarized briefly. Faucet valves should open and close cleanly and gradually without requiring excessive manual force. The mechanism should produce and maintain a seal at the valve seat over a large number of operating cycles over a long period of time. When elastomeric materials are employed for the member engaging the valve seat, as in the case of diaphragm valves, the elastomeric material is desirably soft and pliable to conform to the seat even where the seat is irregular due to mineral build-up or dirt, or erosion of the seat. To avoid abrading and wearing the elastomeric material, it is desirable to have no relative motion between the elastomeric material of the diaphragm and the seat. It is also desirable to utilize fluid pressure to enhance the seal at the seat so as to minimize the stresses imposed on the elastomeric material by outside actuating members and avoid or reduce permanent set of the material.

While to obtain such desirable sealing characteristics suggests the use of elastomeric materials which are soft and pliable, structural considerations suggest the use of materials which are hard and stiff and have the strength of structural members to withstand the stresses imposed by the valve actuating members on the sealing portions of the diaphragm as the valve actuating member forces the diaphragm against the valve seat, and on the supporting section of the diaphragm as the supporting section is flexed during the stroke of the valve actuating member. Moreover, different sections of the diaphragm are desirably hard and stiff to withstand mechanical and fluid pressures prevailing within the valve structures which tend to extrude and stretch the diaphragm out of shape or position.

Finally, the chemical action of water on elastomeric material tends to deteriorate the material. Desirably the characteristics of hardness, elongation and tensile strength should remain constant over the useful life of the diaphragm. This means that not all elastomeric materials may be used in faucet valves, only those capable of withstanding the chemical effect of water.

Recognizing these and other requirements and the problems involved in meeting these requirements, the present invention has as its principal object to provide a diaphragm valve with a diaphragm of soft, pliable elastomeric material that enables optimum sealing characteristics be obtained at the valve seat, and to contribute by means of associated valve assembly components the requisite structural strength to the material so that it is capable of withstanding the stresses imposed on the material due to hydraulic and mechanical pressures.

Another object is to provide an improved diaphragm and associated valve structure in which the diaphragm is molded of soft, pliable elastomeric material providing optimum sealing characteristics at the valve seat and in which the supporting structure will not detract but rather will enhance the sealing function.

A related object is to provide an improved diaphragm in which the supporting portion is thin for flexibility and is arranged outside the valve closure and sealing area which is thick and pliable for sealing, and also absorbs the forces of extrusion and stretching which otherwise act on the supporting portion.

Another object is to provide an improved diaphragm construction having a valve closure portion separate from a supporting section and wherein the supporting section rolls without stretching beyond the fatigue limit of said material during the stroke of the valve closure portion between valve open and valve closed positions, so as to minimize the stresses imposed upon the supportion section of the diaphragm during the operating cycle of the valve.

Another object is to provide an improved diaphragm for a valve construction wherein the flex stresses are minimized in the operating cycle of the diaphragm to extend its life.

Another object is to provide an improved diaphragm and associated valve plunger construction in which the diaphragm is supported in such a manner that it is not stretched under the high water pressure controlled by the valve at any stage of the operating cycle.

Another object is to provide faucet valves which incorporate diaphragm valves having superior flow controlling characteristics and longer life, yet may be manufactured at lower costs than other faucet valves presently commercially available.

A further more specific object is to provide faucet valves of both the single line and double supply line types, which incorporate diaphragm valves having superior flow controlling characteristics and longer life.

These and other objects will be apparent from the following description taken in connection with the accompanying drawings wherein:

FIG. 5 is a horizontal sectional view taken in the plane of lines 5—5 in FIG. 2;

FIG. 6 is a horizontal sectional view taken in the plane of line 6—6 in FIG. 2;

FIGS. 7 and 7a are views like FIGS. 1 and 2 of a replaceable valve cartridge for faucets incorporating an alternative diaphragm valve assembly;

FIG. 8 is a sectional view with portions shown in elevation of a mixing valve assembly embodying the preferred diaphragm valve construction of the invention;

FIG. 9 is a plan view of the mixing valve assembly of FIG. 8;

FIG. 10 is a view of the lower face of the rotary cam, taken in the direction indicated in FIG. 8;

FIG. 11 is a plan view of the hot water plunger, taken in the direction indicated in FIG. 8; and FIG. 12 is a plan view of the cold water plunger taken in the direction indicated in FIG. 8.

While the present invention will be described in connection with a preferred embodiment, it is not intended to be limited to such specific embodiment. On the contrary, it is intended that alternatives, modifications, and equivalents be included within the spirit and scope of the present invention as expressed in the appended claims.

Figure 1:
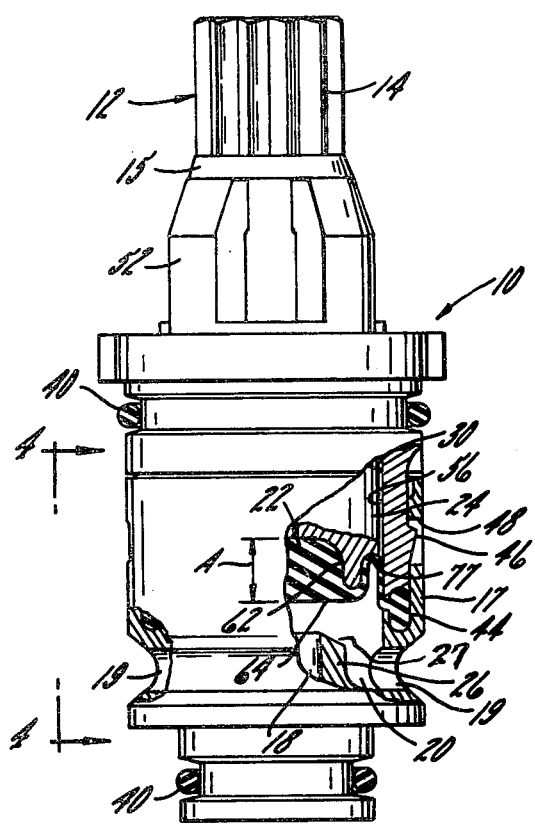
FIG. 1 is an elevational view with portions broken away and shown in section of a replaceable valve cartridge for faucets incorporating a preferred form of diaphragm valve assembly constructed in accordance with the present invention.
Figure 2:
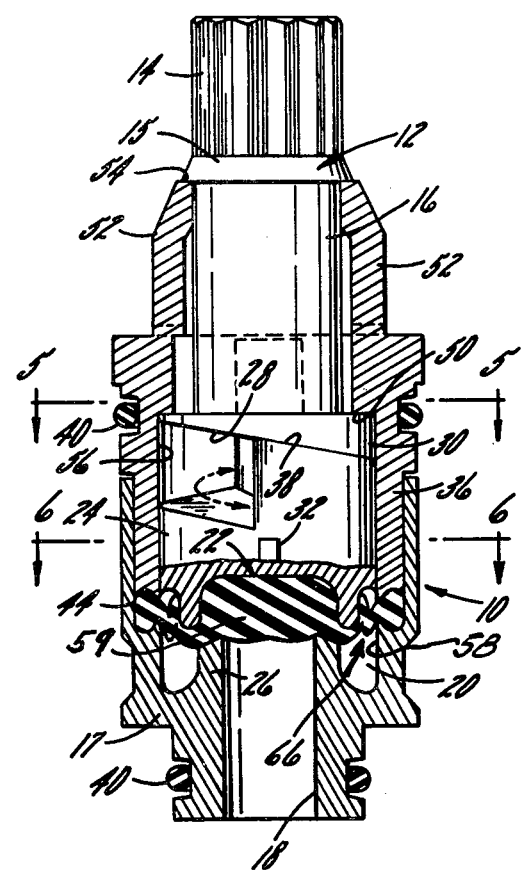
FIG. 2 is a sectional view of the replaceable cartride shown in FIG. 1.
Figure 4:
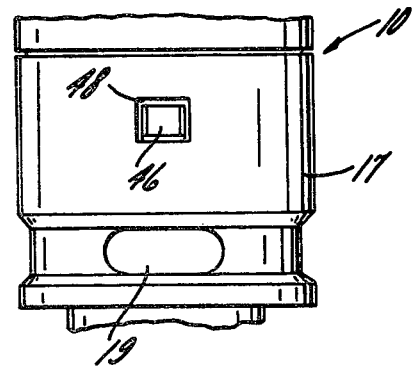
FIG. 4 is a fragmentary elevational view of the cartridge shown in FIG. 2 looking in the direction indicated by the arrows designated 4—4 in FIG. 1.

Turning now to the drawings, and specifically, FIGS. 1 and 2, a replaceable valve cartridge incorporating a diaphragm valve assembly constructed in accordance with the invention, is illustrated. Broadly stated, the valve cartridge includes a generally cylindrically shaped body or housing 10, an operating stem 12 having a knurled portion 14 to which a handle may be attached separated by an annular flange 15 from a smooth portion 16 of the stem. The lower section 17 of the cartridge body 10 is provided with an inlet port 18 and oppositely disposed side outlet ports 19 leading from an outlet chamber 20.

In keeping with the invention, the replaceable cartridge utilizes a preferred construction for the diaphragm valve including a diaphragm 22, a reciprocable valve plunger 24 and a tubular inlet member 26 for water, the end of said tubular inlet member 26 serving as a valve seat 27. The valve plunger 24 is cammed downward from valve open to valve closed position by a cam plate 30 carried by the stem 12. When the stem is turned to the closed position, the cam plate 30 produces a camming force that acts to force the plunger 24 downward against the force tending to raise the diaphragm. That force due to water pressure is utilized to raise the valve plunger 24 to valve open position when the stem is turned to the position. The valve plunger 24 is supported for reciprocal movement along the axis of the tubular inlet in its stroke between valve open and valve closed positions, by means herein shown in FIG. 6 as projecting vertical straight keys 32 on the exterior of the valve plunger 24 received with a sliding fit in keyways 34 in the cylindrical inside wall of the upper section 36 of the body of the valve cartridge. By restraining the plunger 24 so that it cannot rotate, there is no relative movement between the valve plunger and the diaphragm 22, which tends to wear out the diaphragm and shorten its life. Fixing both the plunger and diaphragm against rotation, prevents relative motion between the diaphragm and the valve seat. The upper section of the body 36 has a cylindrical inside wall 37, and valve plunger 24 is cylindrical in outer configuration and is slidably received within the inside wall 37 of the upper section of the body. The cam plate 30 similarly is cylindrical in shape and has a helical or inclined lower cam surface 28 engaging a similarly helical or inclined upper cam surface 38 on the plunger, the cam surfaces on the cam plate and plunger cooperating to reciprocate the plunger 24 upon rotation of the stem 12.

The stem is permitted about 150° of rotation as defined by the arcuate recess 39 (FIG. 5).

The body 10 of the replaceable valve cartridge has a generally cylindrically shaped outer surface and is formed of the two injection molded plastic sections 17, 36. The cartridge is sized to fit in a like sized cylindrical bore in the faucet assembly and has external O-rings 40 in recesses in the outer surfaces of the cartridge for sealing purposes and a pair of ears 42 on the stem end of the body located to fit in correspondingly shaped recesses in the faucet assembly to hold the cartridge against rotation. The upper section 36 and lower section 17 of the cartridge body 10 are telescopingly arranged with the outer bead 44 on the diaphragm of the diaphragm valve assembly clamped between the sections. To assemble the sections, they are slid into telescoping relation and tabs 46 (FIGS. 1, 6) are provided on the outside of the upper section 36 which are received in snap holes 48 in the wall of the lower section 17 of the valve body, the plastic parts having sufficient resilience to allow the sections to be forced together and the tabs 46 to snap into the holes 48 to lock the upper and lower sections against both endwise separation and relative rotational movement.

Figure 3:
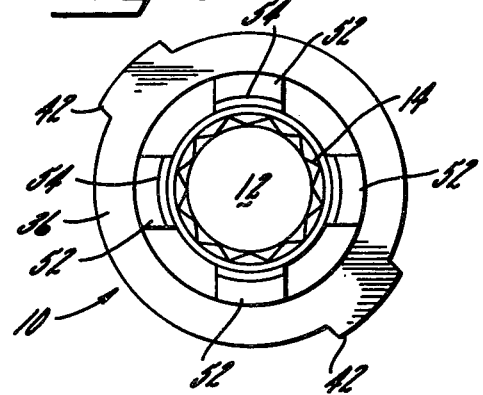
FIG. 3 is a plan view of the cartridge shown in FIG. 1 from the stem end.

As shown more particularly in FIG. 2, the stem 12 carries the cam plate 30 and these elements are held within the upper section 36 of the valve body against axial movement out of the body by the engagement of the top of the cam plate 30 at its outer edge with a shoulder 50 provided by the upper section 36 of the valve body. For preventing both downward and lateral tilting movement of the stem 12, the upper section 36 of the valve body is provided with four outwardly resilient fingers 52, as shown in FIGS. 1-3 which are molded to present an inside bearing diameter slightly smaller than the outside diameter of the smooth portion 16 of the stem 12. In assembly of the stem 12 within the upper section 36 of the valve body, the stem is inserted from the bottom and the annular flange 15 spreads the fingers 52 which snap back and press against the smooth portion 16 of the stem 12. The underside of the flange 15 seats on flat top edges 54 of the fingers 52. The stem 12 and cam plate 30 are thus held by the shoulder 50 and fingers 52 against end play, and the fingers act to take up all clearance and hold the stem 12 against side play or tilting.

Turning now to the valve assembly in more detail, the upper section 36 of the valve body 10 provides a cylindrical internal chamber 56 in which the cam plate 30 and valve plunger 24 are received.

The lower section 17 of the valve body provides a tubular inlet 26 for water, the end of the tubular inlet serving as a valve seat 27. Around the tubular inlet 26 and between the same and an inside wall 58 of the lower section of the valve body there is provided an annular outlet chamber 20 and outlet passages 19, shown in FIG. 1, for water flow from the outlet chamber through the faucet. The diaphragm 22 of elastomeric material is gripped by the bead 44 at its outer edge between the telescoping valve sections 17, 36 and provides a fluid seal between the outlet chamber 20 and the plunger 24 and cylinder 56 supporting the plunger, such that the plunger, cam plate 30 and stem 12 are dry. The invention thus provides a dry stem valve without the problems of corrosion due to water being present or leading into the actuating parts of the valve assembly.

One of the important considerations in the development of this invention has been the selection of a suitable material for the diaphragm 22. It has been found that the material should be one:

(1) that is not attacked by the constituents in water and ages well; i.e. does not crack or split with age;

(2) that has long life without drastic change in its properties of hardness, elongation and strength over many cycles of compression and flexing, and does not take an excessive set when squeezed or compressed for long periods between operating cycles or after many cycles of operation;

(3) that has a sufficiently high fatigue limit so that the stresses imposed on the material in a cycle of operation are significantly less than the fatigue limit;

(4) that has a surface when molded which withstands the erosive effect over long periods of use of the passage of hard particles in water flowing over the material, such as sand, and the abrasive action due to build up on the valve seat providing a rough edge which tends to bite into and abrade the rubber upon engagement and disengagement with the valve seat itself.

While other materials may be found suitable for the diaphragm 22, EPDM rubber with a hardness range of about 60 durometer has been found satisfactory, and the diaphragm 22 is preferably molded of such material in a configuration providing a thick, essentially cylindrical valve closure portion 59 (FIG. 1) with a substantially flat lower surface pressed at the rim against the valve seat 27 in the valve closed position of the plunger as shown in FIG. 2, and which has clearance with the valve seat 27 in the valve open position of the plunger, as shown in FIG. 1, to admit water from the inlet 18 to the outlet chamber 20.

The valve closure portion 59 of the diaphragm 22 is received in a recess 62 in the valve plunger 24 such that the rim of the valve closure portion extends beyond the end of the plunger 24 to engage the valve seat. In the valve closed position, shown in FIG. 2, the rim of the valve closure portion is pressed against the valve seat and the portion of the closure portion above the rim is squeezed slightly to provide a primary seal at the valve seat. The squeezing of the rubber also causes the inside edge of the rim of the closure portion 59 to overhang the inside lip of the valve seat 27, and penetrate into the mouth of the tubular inlet 26. It has been found that to obtain a clean gradual opening at the valve seat when the plunger is raised from the valve closed position, the rubber should not be squeezed more than about 0.035" from its original thickness "A" with a helical cam surface as shown, otherwise too great angular rotation of the handle and stem 12 is required to raise the rim of the valve closure clear of the valve seat 27 to admit fluid flow. Excessive squeeze causes crystallization and thus deterioration in the elastomeric material of the diaphragm. All of these effects are unacceptable in a faucet valve in which a good clean gradual opening of the valve is desired under widely varying pressure conditions as may be encountered in water systems where the pressure can be expected to vary between well pump systems in rural communities to high pressure city water systems. Furthermore, good design practice avoids applying compression stresses to elastomeric material of the types normally used for diaphragms in excess of about 15% of the total thickness in the zone of compression to avoid greatly exceeding the bulk modulus of the material and inducing excessive compression set in the material. With excessive compression set in the valve closure, as the seat erodes and wears away during extended use, initially obtained good seal and gradual opening characteristics will deteriorate.

Accordingly, in the preferred form of the diaphragm construction embodying the invention shown in FIGS. 1 and 2, the valve closure 59 has a thickness or height "A" of about 0.160" such that with a squeeze of approximately 0.024" at the rim, the valve closure portion is longitudinally compressed in the zone of compression above the valve seat 27 substantially 15% of the height of said valve closure portions, to avoid overstressing the resilient material and inducing an excessive compression set, and producing an effective primary seal at the valve seat 27. Furthermore, the thin wall section 66 is preferably less than about 1/32" in thickness to provide the requisite flexibility and rolling action.

Also in keeping with the invention, the primary seal is augmented and enhanced by the effect of fluid pressure to provide a dynamic fluid energized seal achieved in the present case by virtue of the configuration of the closure portion 59 of the diaphragm 22 and the associated plunger.

In the valve closed position (FIG. 2), the end 62 of the plunger 24 is located outwardly of the O.D. of the valve seat 27 and has vertical clearance therewith so that a substantial clearance spaced is left between the end 62 of the plunger and the valve seat 27. The inlet water pressure acts aganist the bottom of the valve closure portion 59 of the diaphragm 22 and squeezes it. The effect of such inlet pressure is to stress the rubber and cause it to flow laterally toward the clearance space between the ends 62 of the plunger and the surface of the valve seat 27, tending to fill the clearance space with rubber and provide a more dense zone of material in the clearance space than in the unstressed condition of the diaphragm. The clearance space is a region of lower stress since the thickness of the diaphragm wall where it passes through the clearance space does not exceed the width of the clearance space in the unstressed condition of the rubber; therefore, the supporting wall is not pinched against the valve seat by the end of the diaphragm but the flow of rubber under such stress creates a more dense condition of the material in the clearance space and it augments the primary seal at the valve seat.

The amount the rubber is squeezed between the valve plunger and seat in the valve closed position, is determined by a number of factors including the height "A" of the closure portion of the diaphragm, and the clearance between the valve plunger and the valve seat. Should rubber take a compression set at the valve seat 27 after a period of use, the thickness of the closure portion in the region contacting the valve seat will become less than the dimension "A", thus reducing the squeeze on the rubber as the valve is closed. Production tolerances allowed in the manufacture of the parts may also affect the amount of the clearance, and due to production tolerances in some of the assemblies produced, the clearance may be less than in others. Should the amount of the squeeze on the rubber be reduced to zero due to a combination of these factors, in keeping with this invention, the fluid pressure in the inlet 18 acting on the lower surface of the closure portion of the diaphragm acts to create the more dense condition referred to above which tends to overcome the compression set and reestablish the seal at the valve seat. This condition created by fluid pressure is believed to be an important aspect of the present invention and contributes to a valve assembly having long life and capable of operation over a large number of operating cycles without failure.

The shapes of the diaphragm and valve seat where they engage are believed to provide longer life and better sealing conditions. Thus, the preferred valve construction as shown in FIGS. 1 and 2, has a diaphragm 22 with a flat lower surface. The valve seat 27 has a pronounced inner corner and a flat downwardly inclined surface, the angle of inclination being in the range of 10°-20° from the horizontal and preferably about 16°. With such a combination as the valve closure portion of the diaphragm 22 approaches the valve seat as the valve is closed, a condition is created of extremely high velocity of water flow laterally from the inlet 18 over the corner of the valve seat 27 which flushes particles in the water supply clear of the contact area between the closure portion of the diaphragm and the inside corner of the valve seat and tends to avoid trapping of such particles between the diaphragm and the valve seat. This is highly advantageous since trapped particles of sand and the like produce pock marks in the rubber due to the compression set of the material when such particles are trapped and embedded in the rubber when the valve is closed. Experience has shown that with water conditions where sand and other relatively large size (up to 1/32nd") particles are likely to be found, the diaphragm and valve seat construction of FIGS. 1 and 2 is preferred over the construction of FIGS. 7 and 7a which has less of the desired flushing action.

In providing the pressure enhanced seal, it is advantageous to have the end 62 of the plunger 24 outwardly of the valve seat 27 as shown, with the inside edge of the tubular end 62 substantially aligned with and having clearance with the outside edge of the valve seat in the closed position of the valve (FIG. 2). By leaving clearance between the tubular end 62 of the plunger and the valve seat sufficient only to receive a radially extending supporting section of the diaphragm 22, while the inlet fluid pressure stresses the rubber and causes it to flow laterally, the clearance space is small enough to prevent the rubber being extruded through it.

A feature of the dome configuration of the valve closure portion is that such portion is received in the recess within the tubular central end portion 62 of the plunger, which fixes the location of the valve closure portion and insures alignment of the rim of the valve closure portion of the diaphragm with the valve seat. The tubular end portion 62 of the plunger contributes support to the valve closure portion of the diaphragm which is of soft, pliable elastomeric material so that it is capable of forming a good seal at the valve seat and conforms to the seat even where particle build up or erosion results in an irregular surface at the seat.

In addition to having the valve closure portion configuration hereinbefore described, the diaphragm 22 shown herein and embodying the present invention is provided with a convoluted radially extending supporting section 66 extending to the peripheral bead 44 which is clamped between the upper and lower sections of the valve body. In the closed position of the valve as shown in FIG. 2, which is the molded position of the diaphragm, the convoluted supporting section has an inner loop 74 which rests against the end 62 of the plunger on the outer side wall thrust and an outer loop 76 in the chamber 20. In the closed position of the valve there is, of course, no water present in the outlet chamber 20 nor any pressure due to water acting against the supporting section 66 of the diaphragm. On the stroke of the valve plunger 24 from the valve closed position to the valve open position shown in FIG. 1, the convoluted supporting section rolls and becomes fully extended in the valve open position forming a loop 77 where it is pressed by pressure of water in the outlet chamber against the end wall of the plunger and the sidewall 58 of the outlet chamber 20. The tubular end portion 62 of the plunger is rounded. The combination of the rounded tubular end portion 62 and stepped end wall above the diaphragm loop 77 provides a sinuous shape (in cross section) for the plunger end outward of the center recess. This is for the purpose of encouraging the desired rolling action of the diaphragm and to provide a continuous backing surface for the diaphragm in the open valve position shown in FIG. 1, such that the diaphragm is flattened against the end of the plunger and the sidewall of the outlet chamber without any stretching.

The diaphragm 22 has a size such that the supporting section 66 when fully extended as shown in FIG. 2 in the open valve position, is flattened against the tubular end 62 and end wall of the plunger and the outlet chamber sidewall 58, by the water pressure in the outlet chamber 20, without any stretching of the diaphragm, and thus without overstressing the diaphragm material, i.e. the dimensions and shape of the plunger, and the location of the mounting bead are such that the radial extent of the diaphragm supporting section is substantially equal to the radial distance along the plunger end wall and sidewall of the outlet chamber to the clamping bead. In keeping with the present invention, long life of the diaphragm material under operating conditions (particularly the supporting section of the diaphragm which flexes during the stroke of the plunger to enable the valve closure portion to move relative to the valve seat) is obtained by a diaphragm and associated plunger construction wherein the stresses in the diaphragm material are held well under the fatigue limit of the material. During each operating cycle, the supporting section of the diaphragm rolls, and the stress points at the tops of the two loops 74, 76 on the supporting section shift radially rather than being concentrated at one point as in a cantilever supporting section. Moreover, the stresses at the stress points in this construction are in the form of tension stresses at the outside of the loop and compression stresses on the inside of the loop with a neutral plane along the middle of the material, without any load on the material due to stretching. These stresses are due solely to the reverse bend required to form the loops and the maximum stress is thus defined. According to the invention, the diaphragm is never excessively stretched by water pressure since the diaphragm is rigidly backed up throughout the stroke of the plunger and in its fully extended condition as shown in FIG. 2 when the full water pressure prevails in the outlet chamber, and thus the material of the diaphragm is never stressed above its fatigue limit, i.e. highest stress which can be repeatedly—a million test cycles—applied without failure.

Now turning to FIGS. 7 and 7a, these Figures illustrate a replaceable cartridge essentially like that shown in FIGS. 1 and 2, with an alternative construction for the diaphragm 32. As in the case of the preferred diaphragm 22, the extending supporting wall of the diaphragm 322 has a convoluted portion 66 (FIG. 7a) which rolls and becomes fully extended in the valve open position (FIG. 7) where it forms a loop and is pressed by pressure of water in the outlet chamber against the end wall of the plunger. The rolling action is encouraged by the cooperating configuration of the end of the plunger 324. The diaphragm 322 has a size such that the supporting section 366 when fully extended (as shown in FIG. 7a) in the open valve position, is flattened against the tubular end. The inverted dished valve closure portion 359 of the diaphragm 322 is received in a recess 362 in the valve plunger 324 such that the end 360 of the valve closure portion extends beyond the end of the plunger 324 to engage the valve seat. In the valve closed position, shown in FIG. 7a, the flat annular lower surface 360 of the valve closure portion is pressed against the valve seat and the sidewall portion 364 of the closure portion above the end 360 is squeezed slightly to provide a primary seal at the valve seat. The squeezing of the rubber also causes the inside edge of the end 360 of the closure portion 359 to overhand the inside lip of the valve seat 327, as shown in FIG. 7a, and penetrate into the mouth of the tubular inlet 326. As in the case of the preferred form of the diaphragm shown in FIGS. 1 and 2, the rubber should not be squeezed more than about 0.025" from its original thickness "A" with a helical cam surface as shown, otherwise too great angular rotation of the handle and stem is required to raise the valve closure clear of the valve seat to admit fluid flow, and also to prevent overstressing of the material in excess of about 15% of the total thickness in the zone of compression, specified by good design practice.

One of the features of the diaphragm construction shown in FIGS. 7 and 7a, which is not present in the preferred construction of FIGS. 1 and 2, arises from the configuration of the valve closure portion of the diaphragm 322 and particularly the recess in the bottom surface of the valve closure portion giving rise to the dish configuration of the diaphragm. With such a construction, illustrated in FIGS. 7 and 7a, the inlet water pressure from the inlet 18 acts against and squeezes the thick side wall 364 of the valve closure portion 359 of the diaphragm, and causes the thick side wall 364 to flow toward the clearance space between the lower end 362 of the plunger and the surface of the valve seat 327. This flow of elastomeric material (i.e. rubber) provides a pressure energized seal which augments the primary seal at the valve seat achieved by the compression of the rubber of the diaphragm against the valve seat itself.

The configuration of the surface of the valve seat 327 shown in FIGS. 7 and 7a is not deemed to be critical; it may be found desirable to utilize a valve seat configuration like that shown in FIG. 1 where the inner corner of the valve seat is pronounced and the surface of the valve seat is essentially flat and inclined away from the inner corner of the valve seat 27. The configuration of the valve seat 327 shown in FIGS. 7 and 7a does encourage the development of the pressure energized seal due to the manner in which the valve closure portion flows inwardly over the inside surface of the valve seat and it is held against the seat by the fluid pressure.

In other respects, the diaphragm 322 is similar to the diaphragm 22 of FIGS. 1 and 2. Thus, the diaphragm 322 has a radially extending supporting wall which terminates in an annular bead 344 clamped between the two sections of the valve cartridge.

Referring now to FIGS. 8–12, to demonstrate that the present invention may be embodied in double line as well as single line type faucet valve assemblies, the invention is shown incorporated in a faucet valve of the mixing valve type for proportioning the flow to an outlet line from separate lines supplying hot and cold water to the valve assembly. Such a mixing valve finds widespread use as a faucet valve for shower heads. In this particular type of valve no means is provided for regulating volume of flow to the shower head, and a separate valve to regulate flow rate is typically used and normally set to provide a constant volume of water to the shower head. The mixing valve embodying the invention enables adjustment of the temperature of the water, and provides the desired arrangement for safety in which initial movement of the operating handle from the off position causes cold water to be supplied to the outlet, further movement of the operating handle causes the proportion of hot water mixed with cold water to be gradually increased, and final movement of the operating handle to the extreme open position causes hot water at the maximum temperature to be supplied to the outlet and the cold water supply substantially closed off. This mixing valve embodying the invention also provides the desired means for setting a maximum limit on the hot water temperature.

While the embodiment of the invention shown in FIGS. 1 and 2 includes a single diaphragm valve assembly, the mixing valve embodiment by a groove 128' of varying depth on the lower face of the cam 130, while (FIG. 10) the cold plunger operating cam surface 228 is provided by concentric (See FIG. 8) rings between which the hot plunger cam groove is formed. The cold plunger cam surface 228 is provided by the bottom or lower edge of these rings which engage the top of the cold water plunger 224.

The hot and cold water plungers are cylindrical at their lower ends and the valve body has cylindrical bores 125, 225 so that the plungers are reciprocably mounted for movement toward and away from the valve seats 127, 227. As previously noted, the hot water plunger 124 has a key 131 as seen in FIG. 11, and the cylindrical bore 125 in the valve body has a cooperating key way, while the configuration of the cold water plunger is irregular and cooperates with the valve body, so that the plungers are mounted for reciprocal movement and restrained against rotational movement. When the plungers 124, 224 are forced by the cams to their positions as shown in FIG. 8, the diaphragms 22 are pressed against the seats 127, 227 and the hot and cold water valves are closed. The hot and cold water plungers 124, 225 each carry upwardly projecting members 129, 229 (FIGS. 11, 12) which engage the respective cam surfaces on the lower face of the rotary cam. The upwardly projecting member 129 on the hot water plunger has an arcuate shape as shown in FIG. 11 and at the top fits within the cam groove 128' in the lower face of the rotary cam 130. Thus on rotation of the cam 130 the cam surface 128 is effective to raise and lower the hot water plunger. The upwardly projecting member 229 on the cold water plunger 224 has, as appears in FIG. 12, a triangular shape and the upper section 136 of the valve body is molded to provide a vertical channel 229' with a like cross-section such that the cold water plunger is reciprocably mounted while restrained against rotational movement. On FIG. 10, the zero reference points for both hot and cold cams are indicated, together with the low and high reference points on both hot and cold cams, to facilitate understanding of their construction.

Since the individual diaphragm valves used in the mixing valve operate in the same fashion and have the same features as the single line faucet diaphragm valve shown in FIGS. 1 and 2, the previous detailed description and explanation of features and operation of the diaphragm valve may be referred to and will not be repeated.

The body of the mixing valve assembly may be formed, as shown in FIG. 8, of upper and lower molded plastic sections 117, 136 with the diaphragms 22 mounted between. The flow path of water is from either or both the inlets 126, 226 to a centrally located outlet passage 140. The mixing valve assembly is constructed for mounting on a fixture (not shown) providing hot and cold water supply lines matched up with the hot and cold water inlets 126, 226 and a single line matched with the outlet passage 140 in the body, for conveying the mixture of hot and cold water to the point of use, such as a shower head or the like. The mixing valve assembly serves as a faucet by providing a water shut-off as well as water temperature regulating function. The mixing valve assembly valve body includes a cover member 142 which is held on the assembly by the long mounting screws 143 which reach through and screw into tapped holes in the fixture (not shown) on which the assembly is mounted.

The hot and cold cam surfaces 128, 228 provided by the rotary cam plate cooperate respectively with the hot and cold plungers 124, 224 to proportion flow of hot and cold water from the inlets 126, 226 to the outlet 140. The rotary cam plate is operated by means of its stem 112 which in turn receives a knob or handle shown in dashed lines in FIG. 8. A longitudinal rib 113 on the stem is shown against an off position stop 115 in FIG. 9, and when turned through 270° comes to bear against the full on stop 115'. One of the features of the invention, described hereinafter, is the provision of means to adjust the full on position stop 115', to enable setting the maximum hot water temperature of the mixed water.

Thus, while the cam surfaces and cooperating plunger surfaces may be changed as desired, it is preferred for safety reasons that as the stem is rotated through about the first 10°, the water is turned on by raising solely the cold water plunger, and thereafter the water temperature is gradually increased through a normal range of usable temperatures from cold through hot and defined by about 200° of rotation of the cam. The final about 60° of cam rotation defines a range of hot water temperatures to the final position where the stem rib 113 is against the full on stop 115' where the hot water line valve is fully open and the cold water line valve is fully closed. To achieve this kind of mixed water temperature characteristic requires dwell regions and sloping regions on both cam surface appropriately located within the 270° of active cam surface, and operating in combination, to move the plungers and so proportion hot and cold water flow as to obtain the mixed flow temperature characteristic desired, as will be fully understood by a man skilled in the art.

To provide means for adjustment of the maximum hot water temperature, an adjustable circular stop plate 143 is provided, mounted on top of the cover member 142 and held in place by a pair of set screws 144. A triangular shaped member 145 carried by the cover member 142 and projecting into the center recess 146 in the cover provides the off position stop 115 against which the rib 113 on the stem 112 bears. By loosening the set screws 144, the stop plate 143 may be rotatably adjusted to shift the full on stop 115 (provided by a triangular shaped member 147 carried by the stop plate 143) from the position shown in solid lines in FIG. 9 where it allows a full 270° of rotational movement of the stem, to a position where it limits the movement of the stem to a smaller angle, for example the position shown in dashed lines where the movement of the stem is restricted to about 170°. The set screws 144 pass through arcuate slots 148 in the stop plate 143 to enable its rotational adjustment when the set screws are loosened, and the screws are then tightened down after the adjustment to fix the position of the member 147 and the full stop 115'. The stop plate thus enables setting a maximum hot water temperature, which is an important feature. The stop plate has a circular projecting rib 149 on its lower surface that is received in a circular groove 150 in the cover for locating purposes, and has a ribbed periphery 151 to facilitate its being rotatably adjusted. As shown in FIG. 9, the triangular element 145 carried by the cover member 142 and providing the off position stop 115, underlies and is coincident with the triangular member 147 carried by the stop plate 143 when located to permit full 270° movement of the stem 112; the triangular element 145 which is carried by the cover member 142 is located in a fixed position to define the off position stop. Thus the on position stop 115' is adjustable without disturbing the fixed location of the off position stop 115.

We claim as our invention:
1. A dry stem, faucet valve assembly, comprising:
a valve body having upper and lower sections,
said lower section having an outlet chamber and an inlet for water extending into said outlet chamber, and terminating in an annular valve seat,
said upper section having a cylindrical chamber, aligned with said valve seat,
a cylindrical valve plunger non-rotatably and reciprocably supported in said upper section chamber for movement along the axis of said valve seat between valve open and valve closed positions, said plunger having a tubular end portion concentric with and having a larger inside diameter than the inside diameter of said valve seat and leaving a clearance space adjacent the outer edge of said valve seat in the closed position of the valve plunger,
a stem projecting from one end of the valve body and extending into said upper section thereof,
cam means carried within said upper section connected for rotation by said stem and operable upon rotation of the stem to push said plunger toward said valve seat,
and a diaphragm of resilient rubber like material mounted at its periphery between said valve body sections, said diaphragm providing a fluid barrier between said outlet chamber and said upper section chamber for maintaining said plunger, cam plate and stem dry,
said diaphragm having a raised portion received in said tubular end portion of said valve plunger and a valve closure portion which is held by said valve plunger in alignment with the valve seat, and pressed against said valve seat in the valve closed position of said plunger, and which has clearance with the valve seat in the valve open position of said plunger to admit water from said inlet to the outlet chamber, and a supporting section extending outwardly from said closure portion through said clearance space to said periphery, including a portion having loops which rolls without stretching beyond the fatigue limit of said material during the stroke of the valve plunger between said positions, said lower section of said valve body including a second outlet chamber and a second inlet terminating in a second valve seat, said inlets being separate and provided for supply of hot and cold water respectively, a common outlet passage for mixed hot and cold water communicating with both said outlet chambers, a second plunger supported for reciprocation along the axis of said second valve seat, and a second diaphragm mounted between said valve body sections, each of said diaphragms having a valve closure portion adjacent the respective valve seat and adapted to be pressed against the respective valve seat by one of said plungers, said rotary cam plate having separate hot and cold water cam surfaces engaging said plungers respectively, and operable upon rotation of the stem and cam plate to reciprocate said plungers and in combination to move said closure portions of said diaphragms relative to said valve seats to proportion the mixture into said common outlet passage of hot and cold water from said separate inlets.

2. A dry stem, faucet valve assembly, comprising:
a valve body having upper and lower sections,
said lower section having an outlet chamber and an inlet for water extending into said outlet chamber, and terminating in an annular valve seat,
said upper section having a cylindrical chamber, aligned with said valve seat,
a cylindrical valve plunger non-rotatably and reciprocally supported in said upper section chamber for movement along the axis of said valve seat between valve open and valve closed positions, said plunger having a tubular end portion concentric with and having a larger inside diameter than the inside diameter of said valve seat and leaving a clearance space adjacent the outer edge of said valve seat in the closed position of the valve plunger,
a stem projecting from one end of the valve body and extending into said upper section thereof,
cam means carried within said upper section connected for rotation by said stem and operable upon rotation of the stem to push said plunger toward said valve seat,
and a diaphragm of resilient rubber like material mounted at its periphery between said valve body sections, said diaphragm providing a fluid barrier between said outlet chamber and said upper chamber for maintaining said plunger, cam plate and stem dry,
said diaphragm having a raised portion received in said tubular end portion of said valve plunger and a valve closure portion which is held by said valve plunger in alignment with the valve seat, and pressed against said valve seat in the valve closed position of said plunger, and which has clearance with the valve seat in the valve open position of said plunger to admit water from said inlet to the outlet chamber, and a supporting section extending outwardly from said closure portion through said clearance space to said periphery, including a portion having loops which rolls without stretching beyond the fatigue limit of said material during the stroke of the valve plunger between said positions,
said upper and lower sections of said valve body telescoping together, said diaphragm being generally cylindrical, and said body having sealing rings at longitudinally spaced locations on the exterior of said body to seal said body in a like-shaped cavity, so that said faucet valve assembly is replaceable and provides a dry stem, replaceable valve cartridge, 3. A dry stem, faucet valve assembly, comprising:
a valve body having upper and lower sections,
said lower section having an outlet chamber and an inlet for water extending into said outlet chamber, and terminating in an annular valve seat,
said upper section having a cylindrical chamber, aligned with said valve seat,
a cylindrical valve plunger non-rotatably and reciprocally supported in said upper section chamber for movement along the axis of said valve seat between valve open and valve closed positions, said plunger having a tubular end portion concentric with and having a larger inside diameter than the inside diameter of said valve seat and leaving a clearance space adjacent the outer edge of said valve seat in the closed position of the valve plunger,
a stem projecting from one end of the valve body and extending into said upper section thereof,
cam means carried within said upper section connected for rotation by said stem and operable upon rotation of the stem to push said plunger toward said valve seat,
and a diaphragm of resilient rubber like material mounted at its peripheral between said valve body sections, said diaphragm providing a fluid barrier between said outlet chamber and said upper section chamber for maintaining said plunger, cam plate and stem dry,
said diaphragm having a raised portion received in said tubular end portion of said valve plunger and a valve closure portion which is held by said valve plunger in alignment with the valve seat, and pressed against said valve seat in the valve closed position of said plunger, and which has clearance with the valve seat in the valve open position of said plunger to admit water from said inlet to the outlet chamber, and a supporting section extending outwardly from said closure portion through said clearance space to said periphery, including a portion having loops which rolls without stretching beyond the fatigue limit of said material during the stroke of the valve plunger between said positions,
said diaphragm having a supporting section extending inwardly from said periphery and carrying a central substantially cylindrical, longitudinally extending valve closure portion in alignment with said valve seat, said valve closure portion having a longitudinal length of about 0.160 inches and being pressed against said valve seat in the valve closed position by said plunger, and having clearance with said valve seat in the valve open position of said plunger to admit water from said inlet to the outlet chamber,
said valve closure portion being longitudinally compressed between said valve plunger and said valve seat no more than about 15% of the height of said valve closure portion, so as to squeeze without overstressing said resilient material and provide a primary seal at the valve seat,
said supporting section being thinner than said valve closure portion having a cross-sectional dimension of less than about 1/32" and extending outwardly from said valve closure portion including a portion having loops which rolls during the stroke of the valve plunger between said positions, said valve plunger having a tubular end portion with said central portion of said diaphragm within said tubular end portion, the inside edge of said tubular end portion of the valve plunger being substantially aligned with the outside edge of the valve seat, and said plunger pressing said central portion of said diaphragm adjacent its rim against said valve seat, and said valve seat presenting a substantially flat surface to said central portion of said diaphragm inclined downwardly from the inside edge of said valve seat, for enhancing the flushing portion of water on the valve seat.

4. In a faucet valve assembly, a valve body having upper and lower sections, said lower section having a chamber with an outlet passage for water, and an inlet for water extending into said chamber, the end of said inlet providing an annular valve seat, a movable valve plunger non-rotatably and slidably supported within the upper section of said valve body for reciprocal movement along the axis of said valve seat between valve open and valve closed positions, said valve plunger having one end portion adjacent said valve seat and with a clearance space therebetween in the valve closed position, and a recess in said one end portion said recess being concentric with and having a larger inside diameter than the inside diameter of said valve seat, and a diaphragm of elastomeric material extending across said chamber and gripped at its outer edge by said valve body to seal and provide one end of the chamber, said diaphragm having an upwardly projecting valve closure portion received in the valve plunger recess with a downward facing surface engaging the valve seat in the valve closed position of the plunger, said closure portion of the diaphragm extending longitudinally beyond said end of the valve plunger and said valve plunger having a valve closed position wherein said downward facing surface engages and is pressed against said valve seat to provide a primary seal and to cause the valve seat to indent the closure portion and the closure portion to overhang the inside lip of the valve seat, said diaphragm further having a convoluted supporting section extending radially through said clearance space from said closure portion which rolls during the stroke of the valve plunger, and said supporting section extending to said outer edge where it is gripped by said valve body, the open valve position of the valve plunger providing clearance between the valve seat and said surface of the valve closure portion to admit water from the inlet which flows radially across the valve seat to the chamber and out the outlet passage, said plunger having an end wall extending outwardly from said end portion against which the supporting section of said diaphragm is pressed by water pressure in the valve open position of said plunger, the combination of said end portion and end wall of the plunger, and the side wall of said chamber in the valve open position of the valve plunger, providing a continuous surface about equal in radial extent to the supporting section of the diaphragm and rigidly backing up said supporting section of the diaphragm throughout the stroke of the plunger and in the valve open position of the valve plunger against the pressure of water in the chamber.

5. In a faucet valve assembly according to claim 4, wherein said upward projecting valve closure portion has an inverted dished shape with a side wall received in the valve plunger recess and an end wall engaging the valve seat in the valve closed position of the plunger, and the inverted dished closure portion of said diaphragm admits water under inlet pressure in the closed position of the valve to a zone beyond the valve seat, the end of the plunger being located closely adjacent the valve seat and leaving said clearance space through which the supporting section of the diaphragm extends, and the water pressure in said zone acting outwardly and squeezing said side wall of the valve closure portion against a side wall of the plunger recess, said valve closure side wall of elastomeric material being sufficiently pliable to flow under water pressure toward the valve seat to provide a pressure energized seal augmenting the primary seal.

6. In a faucet valve assembly including a valve body having an outlet chamber and an inlet for water terminating in an annular valve seat in said chamber, a valve plunger, means within said valve body supporting said valve plunger for non-rotatable reciprocal movement along the axis of said valve seat between valve open and valve closed positions, and a diaphragm of elastomeric material supported in said valve body to seal said outlet chamber from said valve plunger and supporting means and having a valve closure portion held against the valve seat by the valve plunger in the valve closed position to seal said inlet from said outlet chamber, the improvements in said plunger and diaphragm comprising:

said plunger having a tubular end portion providing a recess, said diaphragm having an inverted dished valve closure portion received in said plunger end recess with a side wall lying against a side wall of the recess and extending beyond the valve seat and with an annular rim portion pressed against said valve seat by said valve plunger in the valve closed position to provide a primary seal at said valve seat, the inverted dished valve closure portion of said diaphragm admitting water under inlet pressure to a zone surrounded by said side wall beyond the valve seat, said tubular end portion of said plunger being located, in the valve closed position, adjacent the outer edge of and concentric with the valve seat leaving a peripheral crevice through which the diaphragm extends outwardly into the outlet chamber, and, the water pressure in said zone acting outwardly, in the valve closed position, said side wall of the valve closure portion being squeezed against said side wall of the recess, said valve closure side wall of elastomeric material being pliable and having flowed under inlet water pressure toward the valve seat and over its inside lip without being extruded through said crevice and providing a pressure energized seal augmenting the primary seal.

7. In a faucet valve assembly, the construction according to claim 6 wherein the rim of said valve closure portion where it engages the valve seat is thicker than the valve seat and overhangs the inside lip of the valve seat, in the valve closed position, and penetrates into the valve seat to form a secondary seal, and said pressure energized seal augments the primary and secondary seals.

8. In a faucet valve assembly, the construction according to claim 6 wherein, in the valve closed position, the side wall of the valve closure portion is longitudinally compressed between the valve plunger and the valve seat less than 15% of the height of said side wall, so as to squeeze without overstressing the elastomeric material and provide a primary seal at the valve seat.

9. In a faucet valve assembly, the improvements in said plunger and diaphragm according to claim 6 further comprising:
   said diaphragm having a convoluted supporting section extending radially from said valve closure portion through said crevice which rolls during the stroke of the valve plunger between valve closed and valve open positions,
   the valve open position of the valve plunger providing clearance between the valve seat and the rim of the valve closure portion to admit water from the inlet which flows radially between the valve seat and said rim into the outlet chamber, and
   the end of said valve plunger and the side wall of said outlet chamber, in the valve open position of the valve plunger, providing a continuous surface against which said supporting section of said diaphragm is pressed without being stretched beyond the fatigue limit of the diaphragm material by the pressure of water in said outlet chamber throughout the stroke of the plunger.

10. In a faucet valve assembly, the immprovements in said plunger and diaphragm according to claim 9 wherein said supporting section of said diaphragm has a substantially uniform thickness between said valve closure portion and the outer edge of said supporting section which is formed with a bead, and said supporting section is thinner than the side wall of said valve closure portion, said valve closure portion side wall being thick and pliable to flow under inlet water pressure and provide the pressure energized seal and said supporting section being thin and pliable to roll during the stroke of the valve plunger.

11. In a faucet valve assembly,
   a valve body having upper and lower sections, said lower section having a chamber with an outlet passage for water, and a tubular inlet for water extending into said chamber, the end of said tubular inlet serving as a valve seat,
   a movable valve plunger non-rotatably and slidably supported within the upper section of said valve body for reciprocal movement along the axis of said tubular inlet toward and away from said valve seat between valve open and valve closed positions, said valve plunger having a recess within a tubular end portion concentric with and having a larger inside diameter than the inside diameter of said valve seat,
   and a diaphragm of elastomeric material extending across said chamber and gripped at its outer edge between said valve body sections to seal and provide one end of the chamber,
   said diaphragm having an inverted dished valve closure portion having a side wall received in the valve plunger recess and a rim engaging the valve seat in the valve closed position of the plunger,
   the inside edge of said tubular end of the plunger being substantially aligned with the outside edge of the valve seat, the rim of said closure portion where it engages the valve seat being thicker than the wall of said tubular inlet forming the valve seat,
   the rim of said closure portion of the diaphragm extending longitudinally beyond the tubular end of the valve plunger and said valve plunger having a valve closed position wherein said rim engages and is pressed against said valve seat to longitudinally compress the side wall of the closure portion substantially less than 15% of the height of said side wall of the closure portion to squeeze without overstressing the elastomeric material and provide a primary seal and to cause the closure portion to overhang the inside lip of the valve seat and penetrate into the mouth of the tubular inlet and form a secondary seal,
   said diaphragm further having a convoluted supporting section extending radially from said closure portion which rolls during the stroke of the valve plunger,
   the open valve position of the valve plunger providing clearance between the valve seat and the rim of the valve closure portion to admit water from the tubular inlet which flows radially across the valve seat into the chamber and out the outlet passage, said plunger having an end wall extending outwardly from said tubular end portion against which the supporting section of said diaphragm is pressed by water pressure in the valve open position of said plunger, the combination of said tubular end portion and end wall of the plunger, and the side wall of said chamber, in the valve open position of the valve plunger, providing a continuous surface at least equal in radial extent to the supporting section of the diaphragm and rigidly backing up the supporting section in the valve open position of the valve plunger and throughout the stroke of said plunger againt the pressure of water in the chamber,
   the inverted dished closure portion of said diaphragm admitting water under inlet pressure in the closed position of the valve to a zone beyond the valve seat, the tubular end portion of the plunger being located closely adjacent the valve seat and leaving a peripheral crevice through which the supporting section of the diaphragm extends, and the water pressure in said zone acting outwardly and squeezing said side wall of the valve closure portion against a side wall of the plunger recess, said valve closure side wall of elastomeric material being sufficiently pliable to flow under water pressure toward the valve seat without being extruded through said crevice to provide a pressure energized seal augmenting the primary and secondary seals.

12. In a dry stem, replaceable, faucet valve cartridge, a generally cylindrical valve body adapted for mounting in a like shaped cavity in a faucet assembly,
   said valve body having upper and lower sections, said lower section having an outlet chamber valve means in said outlet chamber, said upper section having a cylindrical chamber and a valve assembly mounted therein and cooperating with said valve means in said lower section,
   a stem projecting from said upper section of the valve body, a cylindrical valve assembly member rotatably mounted in said upper section chamber and connected for operation by said stem, said member having a flat upper surface, said upper section of the valve body having an inwardly extending portion providing a shoulder engaged by said flat upper surface of said member, a set of longitudinally extending, peripherally spaced, outwardly resilient fingers carried by the upper section of the valve body and pressing inwardly and bearing against a smooth portion of said valve stem, said valve stem having an annular shoulder resting against the ends of said fingers, the combination of the shoulder on the valve stem and fingers, and the engagement by the member with the shoulder on the upper section of the body, providing a construction wherein the valve stem may be turned to operate the valve assembly member is held against both sidewise and endwise movement.

13. In a dry stem, replaceable, faucet valve cartridge, generally cylindrical valve body adapted for mounting in a like shaped cavity in a faucet assembly, said valve body having telescoping upper and lower sections, a diaphragm of resilient rubber like material gripped at its outer edge between said telescoping valve body sections, said lower section having an outlet chamber and a valve seat in said outlet chamber, said upper section having a cylindrical chamber and a cylindrical valve plunger non-rotatably and reciprocably supported in said upper section chamber for movement toward and away from said valve seat, said diaphragm having a valve closure portion movable by said plunger against said valve seat to provide a fluid seal between said valve seat and outlet chamber, a stem projecting from said upper section of the valve body, a cylindrical cam plate in said upper section chamber and connected to the stem, said cam plate having a lower cam surface for engaging cam means in the valve plunger and a flat upper surface, said upper section of the valve body having an inwardly extending portion providing a shoulder engaged by said flat upper surface of said cam plate, a set of longitudinally extending, peripherally spaced, outwardly resilient fingers carried by the upper section of the valve body and pressing inwardly and bearing against a smooth portion of said valve stem, said valve stem having an annular shoulder resting against the ends of said fingers, the combination of the shoulder on the valve stem and fingers, and the engagement by the cam plate with the shoulder on the upper section of the body, providing a construction wherein the valve stem may be turned to move the valve plunger and is held against both sidewise and endwise movement.

14. A dry stem faucet valve assembly, comprising:
a valve body having upper and lower sections,
said lower setion having separate inlets for hot and cold water and separate outlet chambers, with each inlet extending into a respective outlet chamber and terminating in an annular valve seat,
said upper section having separate plunger chambers each aligned with a corresponding one of said valve seats in said lower section,
a valve plunger non-rotatably and reciprocably supported in each said upper section chamber for movement along the axis of the corresponding one of said valve seats between valve opened and valve closed positions,
diaphragm means of resilient rubber like material mounted between said valve body sections for providing a fluid seal between said outlet chambers and said upper section chambers,
said diaphragm means including separate valve closure portions each of which is held by the end of one of said valve plungers in alignment with the corresponding valve seat and pressed against said corresponding valve seat in the valve closed position of said one plunger and which has clearance with the corresponding valve seat in the valve open position of said one plunger to admit water from the respective inlet to the respective outlet chamber, and said valve closure portions of said diaphragm means each having a convoluted thin supporting section extending outwardly from said closure portion which rolls during the stroke of the valve plunger between said positions, and
a stem projecting from one end of the valve body and extending into said upper section thereof.
and cam means providing separate hot and cold camming surfaces engaging said plungers respectively, and operable in combination upon rotation of the stem to move said plungers for moving said closure portions of said diaphragm means relative to said valve means to proportion the mixture into said common outlet passage of hot and cold water from said separate inlets.

15. A faucet valve assembly according to claim 14 wherein each of said diaphragm means has a supporting section extending inwardly from the periphery and carries a central substantially cylindrical, longitudinally extending valve closure portion in alignment with the respective valve seat, said closure portion having a longitudinal length of greater than about 0.160" and being pressed against the valve seat in the valve closed position and having clearance with said valve seat in the valve open position of the respective plunger to admit water from said inlet to the outlet chamber,
and said supporting section of each diaphragm means being thinner than said valve closure portion having a cross-sectional dimension of less than about 1/32" and the valve closure portion including a portion having loops which rolls without stretching beyond the fatique limit of said material during the stroke of the respective valve plunger between said positions.

16. A faucet valve assembly according to claim 14 wherein said cam means includes a cam plate carried within ssaid upper section and connected for rotation by said stem, said cam plate having separate hot and cold camming surfaces engaging said plungers respectively, said stem, cam plate and plungers supported in said upper section being maintained dry by said diaphragm means between said upper section and said lower section of said valve body.

17. In a dry stem, replaceable, faucet valve cartridge,
a generally cylindrical valve body having longitudinally spaced sealing rings on the exterior of said body for sealing the valve body in a like shaped cavity in a faucet assembly,
said valve body having telescoping upper and lower sections, said lower section having a chamber with an outlet passage for water, and an inlet for water extending into said chamber, the end of said inlet providing an annular valve seat, a movable valve plunger non-rotatably and slidably supported within the upper section of said valve body for reciprocal movement along the axis of said valve seat between valve open and valve closed positions, said valve plunger having one end portion adjacent said valve seat and with a clearance space therebetween in the valve closed position, and a recess in said one end portion said recess being concentric with and having a larger inside diameter than the inside diameter of said valve seat, and a diaphragm of elastomeric material extending across said chamber and gripped at its outer edge by said valve body to seal and provide one end of the chamber, said diaphragm having an upwardly projecting valve closure portion received in the valve plunger recess with a downward facing surface engaging the valve seat in the valve closed position of the plunger, said closure portion of the diaphragm extending longitudinally beyond said end of the valve plunger and said valve plunger having a valve closed position wherein said downward facing surface engages and is pressed against said valve seat to provide a primary seal and to cause the valve seat to indent the closure portion and the closure portion to overhang the inside lip of the valve seat, said diaphragm further having a convoluted supporting section extending radially through said clearance space from said closure portion which rolls during the stroke of the valve plunger, and said supporting section extending to said outer edge where it is gripped by said valve body, the open valve position of the valve plunger providing clearance between the valve seat and said surface of the valve closure portion to admit water from the inlet which flows radially across the valve seat to the chamber and out the outlet passage, said plunger having an end wall extending outwardly from said end portion against which the supporting section of said diaphragm is pressed by water pressure in the valve open position of said plunger, the combination of said end portion and end wall of the plunger, and the side wall of said chamber, in the valve open position of the valve plunger, providing a continuous surface about equal in radial extent to the supporting section of the diaphragm and rigidly backing up said supporting section of the diaphragm throughout the stroke of the plunger and in the valve open position of the valve plunger against the pressure of water in the chamber.

* * * * *

UNITED STATES PATENT OFFICE
CERTIFICATE OF CORRECTION

Page 1 of 2

Patent No. 4,203,464  Dated May 20, 1980

Inventor(s) Gerald J. Farrell and Rudy Y. Bisonaya

It is certified that error appears in the above-identified patent and that said Letters Patent are hereby corrected as shown below:

Column 1, line 14, change "pread" to -- spread --.

Column 2, line 55, change "cartride" to -- cartridge --.

Column 3, line 46, before "position" insert -- open --.

Column 10, line 24, after "embodiment" insert -- of this invention includes a pair of similar diaphragm valve assemblies each including an identical diaphragm 22. Each diaphragm 22 has a valve plunger 124 and 224 and is mounted between the lower section 117 and the upper section 136 of the valve body. The lower section 117 includes a tubular inlet member 126 for hot water and 226 for cold water and the end of the inlet members 126, 226 serve as a hot water valve seat 127 and a cold water valve seat 227. The valve plungers 124, 224 are cammed downwardly from valve opened to valve closed positions by a rotary cam plate 130 rotated by a stem 112 adapted to carry an operating knob or handle 114 (shown in dashed lines). When the stem 112 is turned to the closed position the cam plate 130 produces camming forces that force both the valve plungers 124, 224 downward against the forces tending to raise the diaphragms 22 and open the valve assembly due to the inlet water pressure acting on both diaphragms. That force due to water pressure is utilized to raise the valve plungers 124, 224 to valve open position when the stem is turned toward the open position. The valve plungers 124, 224 are supported for reciprocal movement and restrained against rotational movement along the axis of the respective valve seats in the strokes between valve open and valve closed positions, by means such as keys 131 on the exterior of the hot water valve plunger 124 (Fig. 11) received with a sliding fit in

UNITED STATES PATENT OFFICE
CERTIFICATE OF CORRECTION

Patent No. 4,203,464  Dated May 20, 1980

Inventor(s) Gerald J. Farrell and Rudy S. Bisonaya

It is certified that error appears in the above-identified patent and that said Letters Patent are hereby corrected as shown below:

(continued)

key ways (not shown) in the cylindrical inside wall of the plunger chamber in the upper section 136 of the body of the valve assembly.

The upper section 136 of the body 136 has a cylindrical inside wall 137 and the cam plate 130 is similarly cylindrical in shape.

The lower face of the rotary cam 130 has two separate and distinct cam surfaces 128, 228 for operating, respectively the hot and cold water plungers 124, 224. The hot plunger operating cam surface is provided --.

Column 17, line 34, change "immprovements" to -- improvements --.

Column 20, line 33, change "the" to -- said --.

Column 20, line 47, change "fitique" to -- fatigue --.

Signed and Sealed this

Sixteenth Day of September 1980

[SEAL]

Attest:

SIDNEY A. DIAMOND

Attesting Officer  Commissioner of Patents and Trademarks